Feb. 13, 1962     W. R. BAKER ET AL     3,021,272
PLASMA HEATING AND CONFINING DEVICE
Filed June 21, 1960
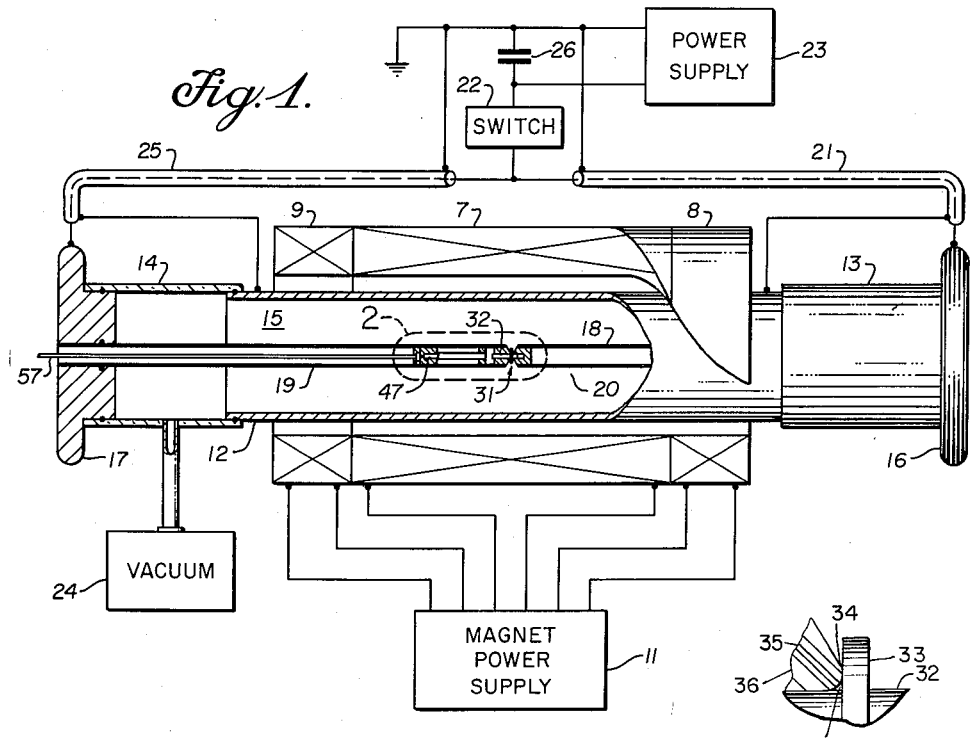
*Fig. 1.*
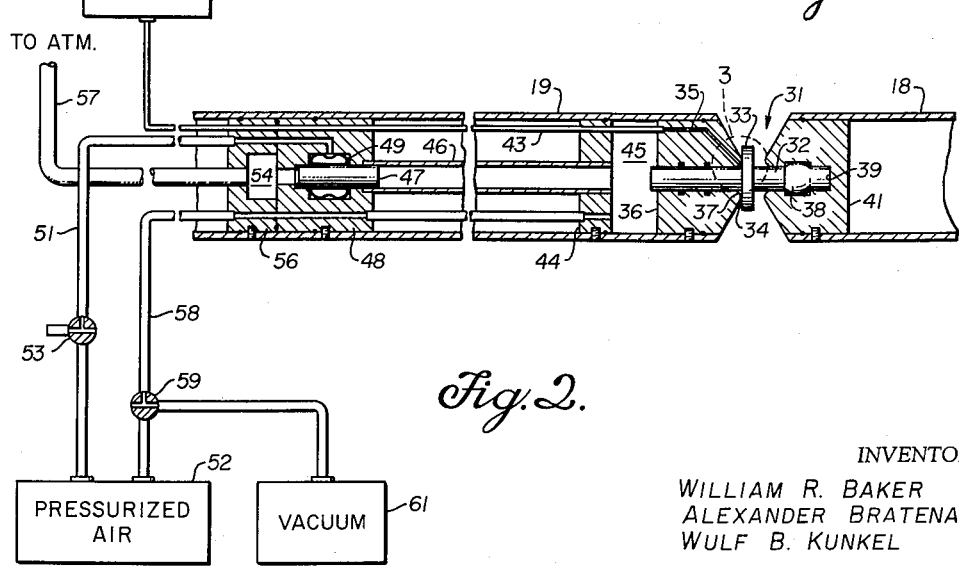
*Fig. 2.*
*Fig. 3.*
INVENTORS
WILLIAM R. BAKER
ALEXANDER BRATENAHL
WULF B. KUNKEL
BY Roland A. Anderson
ATTORNEY though the vacuum chamber. A long tubular electrode is disposed along the axis of the coil and functions both as a means for introducing gas into the chamber and as a means for establishing a radial electric field in the chamber between the electrode and the surrounding chamber.
3,021,272
PLASMA HEATING AND CONFINING DEVICE William R. Baker, Orinda, and Alexander Bratenahl and Wulf B. Kunkel, Berkeley, Calif., assignors to the United States of America as represented by the United States Atomic Energy Commission
Filed June 21, 1960, Ser. No. 37,816
13 Claims. (Cl. 204—193.2)

The present invention relates to apparatus for generating, containing and heating an electrical plasma and, more particularly, to an improved device suitable for use as an ion source, neutron source, and for other purposes requiring the trapping and heating of a plasma.

In general, the present invention is in the class of plasma devices which utilize crossed magnetic and electric fields for confining and heating charged particles. In this apparatus a solenoid magnet coil is disposed around a vacuum envelope and provides a magnetic field directed axially through the vacuum chamber. A long tubular electrode is disposed along the axis of the coil and functions both as a means for introducing gas into the chamber and as a means for establishing a radial electric field in the chamber between the electrode and the surrounding chamber.

In the foregoing machines the degree of plasma heating is determined in part by the magnitude of the electric and magnetic fields which can be obtained. The magnitude of the electric field is in turn limited by voltage breakdown across the insulators which are necessary to connect the central electrode with the vacuum chamber. The presence of the fuel gas adjacent such insulators is a factor contributing to such breakdown, since the insulators tend to be bombarded by the heated plasma with resultant deterioration of the insulative qualities thereof.

The present invention reduces the foregoing difficulty by a novel structure in which plasma heating occurs away from the insulators and therefore the electric field strength obtainable is considerably higher than in prior devices and the energy imparted to the plasma is greatly increased.

The invention accomplishes the above objective by providing for the injection of gas into the center of the vacuum chamber in a sharply defined burst. As generally operated, the gas is radially emitted at the center of the chamber from the central electrode after the crossed electric and magnetic fields have been established. As the gas diffuses from the opening in the central electrode to the outer chamber wall, a discharge occurs in which the neutral gas is rapidly converted into an energetic plasma. The distance between the central electrode and the outer chamber wall is made small in comparison with the distance from the gas injection region to the insulators at the ends of the device so that the neutral gas does not diffuse to the insulators for a considerable period and thus the discharge effectively occurs only in the central region of the apparatus. It will be noted that the device may serve as its own switch inasmuch as the injection of the gas initiates the discharge.

The discharge causes nuclear interactions to occur through processes well known to those skilled in the art. Typical reactions within a plasma as well as the conditions for the reactions are described in the text: Bishop, Project Sherwood, Addison-Wesley, 1958, pages 1 to 13, and in the article: Controlled Fusion Research—an Application of the Physics of High Temperature Plasmas, by R. F. Post, Reviews of Modern Physics, Vol. 28, No. 3, pages 338–362, July 1956. Such mechanisms contribute to the generation of high temperature ions, neutrons, and the production of nuclear interactions. The heat of fusion of the gas particles may exceed the input energy and useful power may be extracted.

Accordingly, it is an object of this invention to provide an improved plasma generating and containment means of the class employing crossed electrical and magnetic fields.

It is an object of the present invention to provide means for increasing the maximum thermal energy imparted to a contained plasma.

It is an object of this invention to provide means for the rapid pulsed injection of gas at the central region of a plasma containment apparatus of the type having coaxial electrodes and a longitudinal magnetic field.

It is a further object of this invention to overcome the limitations imposed by the breakdown of insulators in the vicinity of an electrical plasma discharge so that increased heating of a plasma may be obtained.

The invention, both as to its organization and method of operation, together with further objects and advantages thereof, will be better understood by reference to the following specification taken in conjunction with the accompanying drawing in which:

FIGURE 1 is a broken out view of a plasma apparatus embodying the invention with portions of the electrical circuitry shown schematically;

FIGURE 2 is an enlarged axial section view of a valve structure shown in FIG. 1 and including the portions of FIG. 1 enclosed by dashed line 2 thereof, and FIGURE 3 is an enlarged view of the portion of FIGURE 2 enclosed by dashed line 3 thereon.

Referring now to the drawing and, more particularly, to FIG. 1 thereof, a magnetic field is established within a long cylindrical solenoid coil 7. To provide charged particle reflecting mirror fields at each end of coil 7, additional coils 8 and 9 are positioned one against each end of the coil 7 in coaxial relationship therewith. Coils 8 and 9 may be provided with a greater number of turns than coil 7 or alternately may be provided with greater energization current to provide the desired intensified field at the ends of the principal coil 7. Current for each of the coils 7, 8 and 9 is provided by a suitable power supply 11.

A conducting cylinder 12, which may be of stainless steel, is disposed coaxially within the coils 7, 8 and 9 and acts both as an outer electrode and as a vacuum tank. The cylinder 12 should be made long in relation to its diameter and each end of the cylinder projects a short distance from the adjacent mirror field coil 8 and 9. A pair of cylindrical insulators 13 and 14 are secured to the ends of cylinder 12 adjacent to mirror field coils 8 and 9, respectively, the insulators being coaxial with the cylinder and hermetically sealed thereto. Circular end plates 16 and 17 are secured to the ends of insulators 13 and 14 respectively in coaxial relationship thereon.

A long tubular center electrode 20, comprised of two separate sections 18 and 19 of approximately equal length, is mounted along the axis of cylinder 12, each section of the electrode 20 extending through a central passage in the end plates 16 and 17 and being supported thereby.

The cylinder 12 in conjunction with insulators 13 and 14 and end plates 16 and 17 thus defines a vacuum chamber 15 in which a plasma trapping region may be established.

A radial electric field is created between the center electrode 20 and the cylinder 12 by applying a high potential therebetween from a capacitor bank 26 which capacitor bank is connected by coaxial transmission lines 21 and 25 to each end of the electrode 20. The center conductors of the coaxial lines 21 and 25 are connected to the end electrodes 16 and 17 respectively while the outer conductors of the coaxial lines are connected to cylinder 12. For convenience and safety, the cylinder 12 is preferably held at ground potential. A switch 22 may be connected between the capacitor bank 26 and the center conductors of the coaxial lines 21 and 25 for controlling the exact time when the electric field is created, however, as will hereinafter be discussed, the switch 22 is not essential as a discharge can be initiated by the injection of gas into cylinder 12. The capacitor bank 26 is charged from a high voltage power supply 23 connected thereacross, the low inductance of the capacitor bank 26 as compared to that of the power supply 23 allowing a larger instantaneous quantity of power to be provided to establish an electric field between cylinder 12 and inner electrode 20.

To evacuate the chamber 15 a suitable vacuum pump 24 is connected with a port in the cylindrical insulator 14.

To establish a plasma within chamber 15, a metered quantity of the gas is emitted into the chamber 15 in a very short burst, by a valve at the center of electrode 20, the valve being hereinafter described. The gas diffuses radially outward from the central electrode 20 toward the cylinder 12. Prior to opening of the valve, the chamber 15 is evacuated and coils 7, 8 and 9 are energized to provide the magnetic field. After the magnetic field reaches a maximum value, the fast valve is actuated and the gas released into the chamber 15. The electric field may be established either before the gas is released or shortly thereafter by closing of switch 22 during the interval in which the gas is diffusing into the chamber 15. The quantity of gas and rate of diffusion is controlled so that ionization is extended over a time period of several microseconds to avoid lowering the electric field potential, however, such time period must be short compared to the diffusion time of the gas to the insulators 13 and 14. When the gas reaches the vacuum tank 12, a discharge immediately occurs between electrode 20 and cylinder 12 ionizing the gas and converting it into a plasma comprised of electrons and ions. The motion of the charged particles across the axially directed magnetic field, caused by the radial electric field, causes the particles to rotate about the central electrode 20. The action of the apparatus in establishing a rotating plasma is similar to that described in the text: Bishop, Project Sherwood, Addison-Wesley, 1958, pages 127–129.

The plasma rotates about the center electrode 20 at a very high drift rate given by the expression:

$$V = \frac{E}{B}$$

where E is the radial electric field in volts per meter, B is the magnetic field intensity in Webers per square meter and V is the particle velocity in meters per second. The centrifugal force on the plasma causes the charged particle to tend to move outwardly across the magnetic lines, thereby causing very high currents to flow through the plasma in a circular path. The magnetic lines are distended outwardly in the heating zone, forming a magnetic mirror which inhibits the spreading of the plasma towards the ends of the machine. The spreading of the plasma is still further inhibited by the magnetic mirrors formed by the mirror coils 8 and 9. The ionization process must continue over a period of the order of microsecond, so that the maximum electric field intensity can be maintained when utilizing a power supply of practical impedance. Immediately following formation, each ion acquires a velocity of cyclotron motion such that the average energy of this motion is equal to the energy of drift motion V given above. This energy becomes randomized and appears as heat. The plasma heating occurs before the particles can reach the vicinity of the cylindrical insulators 13 and 14, and the difficulty of insulator breakdown is thus avoided. Accordingly, the applied electric field may have a greater intensity by a factor of approximately ten or more than when insulator breakdown must be considered.

It is important in the operation of the invention that the fuel gas be released in an annular axially symmetric pattern into the chamber 15 and in a very short increment of time, therefore a specialized valve must be utilized at the center of electrode 20. It is desirable that the valve be constructed of non-magnetic material to avoid perturbation of the field.

Referring now to FIG. 2, the valve structure is shown mounted within the center electrode segments 18 and 19. An annular gas emission opening 31 is formed around the circumference of the center electrode 20 by the gap between the segments 18 and 19 thereof. An annular valve support member 36 is mounted coaxially within the end of electrode segment 19 adjacent opening 31 and is provided with a tapered end projecting into the opening, the extreme end of the support member being flattened to form a valve seat 34. A rod shaped valve member 32 is slidingly disposed within an axial passage in the support member 36, the valve member extending across the gap between the electrode segments 18 and 19 and having a flange 33 at an intermediate point which flange may abut the valve seat 34. A small plenum chamber 37, better shown in FIGURE 3, is provided in valve seat 34 which chamber is closed by abutment of the flange 33 thereagainst. In order to maintain an effective seal for gas as well as for withstanding the impact necessary for opening the valve, a material such as nylon is utilized for the valve member 32.

The end of valve member 32 bears against a resilient rubber block 38 seated in a cavity 39 in an annular block holder 41 which block holder is mounted in the end of the central electrode 18 adjacent the annular opening 31, the block 38 thus acting to normally hold flange 33 against the valve seat 34. The cavity 39 is somewhat larger than the resilient block 38 to allow for deformation thereof when under compression. The plenum chamber 37 communicates with a gas supply 42 through a channel 35 in support member 36 which connects with a conduit 43 passing longitudinally through the central electrode section 19. The conduit 43 is sufficiently restricted in size so that during the short time the valve is open the gas flow therethrough is insignificant compared with the gas release from the plenum 37. During the interval when the valve is closed, however, sufficient gas can pass through the channel 43 to fill the plenum chamber 37.

Considering now the means for opening the valve, the end of the valve member 32 opposite the resilient block 38 extends into a first chamber 45 in the central electrode 19. An annular block 44, spaced apart from the valve support 36, provides the opposite wall of the chamber 45. A long tubular barrel 46 is disposed along the axis of electrode section 19, one end of the barrel extending through a central passage in block 44 and being supported thereby. The other end of the barrel 46 is supported by a second block 48 which is mounted in electrode section 19 and which has a central cavity therein.

To deliver an impact to the end of valve member 32, a cylindrical hammer 47 is slideably disposed in barrel 46 in coaxial relationship therein. Prior to opening of the valve, the hammer 47 is held within the cavity of block 48 by a flexible annular sleeve 49 therein which sleeve encloses the hammer and which is compressed against the hammer by the admission of high pressure air into the cavity at the outer side of the sleeve. To provide the compressed air for holding the hammer 47, an air conduit 51 connects the cavity of block 48 with a pressurized air supply 52, the conduit 51 extending longitudinally through electrode section 19. A valve 53 in the conduit 51 controls the clamping action of the sleeve 49.

A second annular block 56 is positioned adjacent block 48 and is provided with a chamber 54 communicating with the cavity of block 48. An air conduit 57 connects chamber 54 with the atmosphere so that the chamber is constantly at atmospheric pressure which pressure is exerted on the adjacent end of hammer 47. A third conduit 58 connects the chamber 45, between block 44 and 48, with a valve 59 which valve serves to selectively connect the chamber 45 to either the compressed air source 52 or a vacuum pump 61.

In operation the hammer 47 is securely clamped by the sleeve 49 as hereinbefore described while the first chamber 45 and the interior of the barrel 46 are coupled to the vacuum 61 by appropriate adjustment of valve 59. When the release of gas into the system is to be made as hereinbefore described, the pressure on the sleeve 49 is released by operation of valve 53 and the hammer 47 accelerates along barrel 46 owing to the atmospheric pressure back of the hammer and the vacuum on the forward side thereof. The hammer 47 attains a high velocity as it strikes the valve member 32, the shock causing the flange 33 to open the plenum chamber 37 very rapidly and to release gas therein into the plasma chamber. The plenum chamber 37 remains open until the resilience of block 38 reacts against the valve member 32 and closes the plenum.

To return the hammer to the sleeve 49, the valve 59 is set to fill the chamber 45 with pressurized air, pushing the hammer 47 back through the barrel 46. When the hammer reaches the sleeve 49, the sleeve is again contracted by operation of valve 53 and the hammer is thus locked into position. The valve 59 is again operated to create a vacuum in the chamber 45 and in the barrel 46. While the operation is being performed, the plenum chamber 37 refills with gas and the apparatus is set for a subsequent cycle of operation.

While the invention has been disclosed with respect to a single embodiment, it will be apparent to those skilled in the art that numerous variations and modifications may be made within the spirit and scope of the invention and thus it is not intended to limit the invention except as defined in the following claims.

What is claimed is:

1. In a plasma generating and containment device, the combination comprising a cylindrical hermetically sealed outer electrode, an inner electrode disposed within said outer electrode and having an opening in the wall and an interior passage communicating therewith, means supplying gas to said passage of said inner electrode, a fast opening valve controlling the emission of gas from said opening of said inner electrode, means for applying an electrical potential to a first of said electrodes relative to the other thereof, and means providing a longitudinally directed magnetic field within said outer electrode around said opening.

2. In a plasma containment and heating apparatus, the combination comprising a cylindrical gas tight outer electrode, a cylindrical inner electrode of lesser diameter than said outer electrode and disposed coaxially therein, said inner electrode having an opening in the wall thereof, a gas source communicating with said opening through the interior of said inner electrode, a fast opening valve associated with said inner electrode and operative upon said opening thereof, an electrical power supply providing a potential difference between said inner and outer electrodes, and means establishing an axially directed magnetic field between said inner and outer electrodes in the region of said opening of said inner electrode.

3. A plasma containment and heating apparatus as described in claim 2 and wherein said opening on said inner electrode is annular and extends completely around the periphery of said inner electrode.

4. In a plasma trapping and heating device, the combination comprising a solenoid coil providing a magnetic field, a cylindrical outer electrode positioned coaxially within said coil, a cylindrical inner electrode of lesser diameter than said outer electrode and disposed coaxially therein, said inner electrode having a gas emission opening in the wall thereof, said opening being situated substantially at the center of said solenoid coil, a power supply connectable between said inner and outer electrodes, means providing gas through the interior of said inner electrode to said opening thereof, and a fast opening valve disposed within said inner electrode and controlling the emission of gas through said opening in the wall thereof.

5. A plasma generating and containment apparatus comprising, in combination, a cylindrical hermetically sealed outer electrode, a cylindrical inner electrode having an opening in the wall thereof, said inner electrode being of less diameter than said outer electrode and being disposed coaxially therein to provide an annular plasma region between said electrodes, means for evacuating said region between said electrodes, a gas supply communicating through said inner electrode with said opening in the wall thereof, an electrical power supply connected between said inner and outer electrodes, means providing a longitudinal magnetic field in said region between said electrodes and around said opening, and a fast opening valve disposed within said inner electrode and controlling the emission of said gas through said opening in the wall thereof.

6. A plasma containment and heating apparatus comprising, in combination, a solenoidal coil having a magnetic field therein, a cylindrical outer electrode disposed longitudinally within said coil, said outer electrode being gas tight, means for evacuating said outer electrode, a cylindrical inner electrode disposed longitudinally within said outer electrode, said inner electrode being of substantially less diameter than said outer electrode to form an annular plasma region between said electrodes, said inner electrode having an annular gas emission opening formed around the periphery thereof at an intermediate longitudinal position thereon which position is within said magnetic field and having a gas passage communicating with said opening, means supplying gas to said passage of said inner electrode, an electrical power supply connectable between said electrodes to provide a potential difference therebetween, and a fast opening valve associated with said inner electrode and controlling the emission of gas through said opening.

7. A plasma containment and heating apparatus as described in claim 6 and comprising the further combination of a capacitance connected between said inner and outer electrodes and a switch connected between said inner and outer electrodes in series realtionship with said capacitance, said electrical power supply being connected across said capacitance.

8. A plasma containment and heating apparatus as described in claim 6 and comprising the further combination of a pair of additional solenoid coils, said additional coils being spaced apart and disposed one on each side of the center of said outer electrode and in coaxial relationship therewith to provide a magnetic mirror field at each end of said annular plasma region.

9. A plasma containment and heating apparatus comprising a long solenoid coil providing a longitudinal magnetic field therein, a cylindrical outer electrode disposed coaxially within said coil, a cylindrical inner electrode disposed coaxially within said outer electrode, said inner electrode being of substantially less diameter than said outer electrode to define an annular plasma region therein and being of greater length than said outer electrode whereby a terminal portion of said inner electrode projects from each end of said outer electrode, said inner electrode having a gas emission opening in the form of an annular band encircling a central portion of said electrode and having an internal passage communicating with said opening, a pair of annular insulators disposed one at each end of said electrodes to hermetically seal said plasma region, means for evacuating said plasma region, a gas supply communicating with said opening of said inner electrode through said passage therein, an electrical power supply connectable between said outer and inner electrodes and providing a potential difference therebetween, and a fast opening valve disposed within said inner electrode at said opening therein said valve normally closing said opening and having provision for rapid opening thereof.

10. A plasma containment and heating apparatus substantially as described in claim 9 and wherein said valve comprises a valve member movable into a position occluding said opening in said inner electrode, resilient means bearing against said valve member to urge said valve member into said position, and means for selectively striking said valve member to momentarily retract said member from said position.

11. In a plasma generating and heating apparatus, the combination comprising a cylindrical hermetically sealed outer electrode, a cylindrical inner electrode disposed coaxially within said outer electrode, said inner electrode having an annular opening encircling a central portion thereof and having a first longitudinal passage at a first side of said annular opening, said inner electrode having a second longitudinal passage communicating with said first passage at a point proximal to said annular opening, means supplying gas to said second passage of said inner electrode, a valve member slideably disposed in said first passage of said inner electrode at said annular opening and having a flange extending outwardly in said opening, resilient means disposed in said inner electrode and urging said valve member towards said first side of said annular opening whereby said flange prevents the emission of gas through said opening, a movable hammer element slideably mounted in said first passage of said inner electrode and travelable against said valve member to momentarily displace said flange of said valve member from said first side of said annular opening, means for selectively establishing a pressure differential within said first passage of said inner electrode on opposite sides of said hammer to effect said travel of said hammer, an electrical power supply connectable between said inner and outer electrodes, and means providing a longitudinally directed magnetic field within said outer electrode.

12. A plasma generating and heating apparatus substantially as described in claim 11 wherein said inner electrode is provided with a third longitudinal passage communicating with said annular opening and wherein said inner electrode is provided with a fourth passage communicating atmospheric pressure with said first passage at a point remote from said annular opening, and wherein said means for establishing a pressure differential within said first passage for effecting travel of said hammer comprises a compressed air supply, a vacuum source, a valve having a first position connecting said air supply to said third passage of said inner electrode to retract said hammer from said valve member and having a second position connecting said vacuum source with said third passage to create a force impelling said hammer towards said valve member, and selectively releasable means for holding said hammer at a position remote from said valve member.

13. A fast opening valve for the radial ejection of an annular body of gas from a cylindrical electrode in a plasma device, which electrode has a coaxial annular opening in the wall thereof dividing said electrode into first and second sections and which electrode has a longitudinal passage in said first section which passage extends to said opening, said valve comprising a longitudinally slideable valve member mounted in said passage which member is provided with a flange projecting radially into said opening, resilient means urging said valve member towards said first section of said electrode to cause said flange to bear against a first side of said opening, means supplying gas to said opening in said electrode at said first side thereof, a hammer element slideably disposed in said passage for travel towards said valve member and for retraction therefrom, and means for selectively establishing pressure differentials in said passage on opposite sides of said hammer element to effect said travel of said hammer element whereby said hammer element may be selectively impelled against said valve member to momentarily retract said flange from said side of said opening and to release said annular body of gas therefrom.

References Cited in the file of this patent
UNITED STATES PATENTS
2,961,559    Marshall _____ Nov. 22, 1960